United States Patent [19]

Elbich et al.

[11] Patent Number: 5,622,393
[45] Date of Patent: Apr. 22, 1997

[54] RE-USABLE FITTING FOR FLEXIBLE HOSES

[75] Inventors: Robert J. Elbich, Fogelsville, Pa.; Norman B. Cooling, Bridgewater, N.J.

[73] Assignee: Pure Fit Incorporated, Pa.

[21] Appl. No.: 497,706

[22] Filed: Jun. 30, 1995

[51] Int. Cl.$^6$ .................................................. F16L 33/22
[52] U.S. Cl. ............................ 285/245; 285/247; 285/259
[58] Field of Search .................................... 285/245, 246, 285/247, 259

[56] References Cited

U.S. PATENT DOCUMENTS

| | | | |
|---|---|---|---|
| 768,188 | 8/1904 | McIntyre et al. | 285/247 |
| 773,965 | 11/1904 | McIntyre et al. | 285/247 |
| 1,195,433 | 8/1916 | Bailey | 285/247 |
| 1,233,401 | 7/1917 | Reeve | 285/247 |
| 2,551,536 | 5/1951 | Harvey | 285/247 |
| 2,853,320 | 9/1958 | Liebelt et al. | 285/247 |
| 3,177,016 | 4/1965 | Nolmgren | 283/247 |
| 3,246,921 | 4/1966 | Lyon et al. | 285/247 |
| 4,951,976 | 8/1990 | Boelkins | 285/249 |
| 5,176,411 | 1/1993 | DuPont, Jr. | 285/249 |
| 5,240,291 | 8/1993 | Zornow | 285/40 |

*Primary Examiner*—Eric K. Nicholson
*Attorney, Agent, or Firm*—Eckert Seamans Cherin & Mellott

[57] ABSTRACT

A re-usable fitting for a flexible hose includes a body and a nut that have opposed tapering ribs or barbs in complementary pairs that engage the hose substantially as the body and nut are fully tightened. The body forms a hollow nipple extending from a base portion to a head with a series of axially spaced annular barbs and has screw thread formed near the base. Inserting the nipple into an end of the hose flares the end of the hose. The nut has internal screw threads and a complementary set of opposite barbs. Tightening the nut on the nipple displaces the opposed barbs axially until aligned in complementary pairs to annularly constrict the hose. Each annular constriction is smaller than the wall thickness of the hose, both engaging the hose and displacing the hose into gaps on opposite axial sides of each annular constriction.

16 Claims, 2 Drawing Sheets

RE-USABLE FITTING FOR FLEXIBLE HOSES

BACKGROUND OF THE INVENTION

1. Field of the Invention

This invention relates to fittings for flexible hoses, and in particular concerns reusable fittings that can be detached from a worn hose and re-used with a new hose, in the field by an end-user, without requiring special tools or the application of excessively high torque.

2. Prior Art

The invention is particularly advantageous for end fittings and couplings on flexible hoses of the type used for sanitary conduit, but is also useful in other situations. Sanitary conduit is useful or required by many industries, such as the dairy, beverage, food processing and pharmaceutical industries. One option for sanitary conduit is stainless steel piping. Another option has been flexible hose. In a fixed installation, the useful life of flexible hose is generally much shorter than that of stainless steel piping. It becomes necessary to service and replace worn hoses when in contrast, stainless steel piping may last indefinitely.

On the other hand, flexing requirements or the like may be such that flexible hose is preferred over stainless steel piping for a given use. Flexible hose is easier to configure and reconfigure in a given plumbing situation. Replacement of the flexible hose is not so problematical given that flexible hose is relatively inexpensive. End-fittings and couplings for flexible hose, however, are relatively costly. It is advantageous to enable change-over of fittings from a worn hose to a new hose, i.e., to replace only the worn flexible tubing part of the connections, to save costs. For that purpose, the end-fittings should advantageously permit change-over at the site of the installation, preferably by the end-user and without requiring special tools.

The end fittings generally involve a structure that is complementary to another fitting for connecting the hose in fluid communication with another conduit, and structure that provides a fluid-tight connection between the fitting and the hose. U.S. Pat. No. 5,176,411- DuPont, Jr. discloses an example of a fitting for a flexible hose. The DuPont fitting comprises a body, a collar and a sleeve. The collar has a through-bore, and has a counter-bore extending inward from one end of the collar. The through-bore is slightly tapered or conical. The counter-bore has an internal thread. The sleeve has an outside shape that is likewise tapered or conical to match the collar's internal taper. These parts are arranged inside and outside the hose at the end and are arranged together to grip the hose.

More particularly, the end of the hose is strung through the collar and the sleeve, i.e., the collar and sleeve are pushed down on the outside of the hose from the end, to a position out of the way. Thus the hose is prepared for frictional engagement on the body. The body includes a nipple with threads near its base, external barbs near its head, and a shoulder between the thread and barbs. The hose is frictionally forced onto the nipple until the end abuts against the shoulder with the barbed portion inside the hose. The outer diameter of the nipple preferably is slightly larger than the inner diameter of the hose at rest, such that the hose is slightly stretched or swollen in the process of being forced onto the nipple.

The sleeve is then slid back toward the end of the hose from its out-of-the way position to a position encircling the nipple inside the hose. The collar is likewise retrieved from its out-of-the way position to a position surrounding the sleeve. The collar and nipple threads are then meshed, and tightening the tapered collar on the nipple wedges the tapered sleeve, until the sleeve deforms and tightly grips the outside of the hose. The hose thus is squeezed inside and outside between the sleeve and nipple, sufficiently to obtain a fluid-tight or air-tight seal with the fitting. In the DuPont fitting, the internal barbs grip the inside of the hose to prevent axial dislocation of the hose from the fitting.

U.S. Pat. No. 5,240,291 - Zornow discloses another fitting for flexible hose. The Zornow hose comprises a body and nut only. The nut has a through-bore, and has a counter-bore extending inward from one end to a shoulder. The through-bore has a screw or machine type thread pitched in one direction, and the counter-bore has biting threads pitched in the other direction. The biting threads are coarse and are arranged cylindrically, for biting into the outside of the hose and generally forming complementary threads on the outside of the flexible hose. The nut is twisted onto the flexible hose via the biting threads of the counter-bore until the end of the hose abuts against a shoulder in the nut. At that point, the nut and hose are ready for accepting the body.

The body has a nipple with a screw or machine thread near its base, and a slightly conical but nearly cylindrical portion near its head. The head inserts through the screw thread of the nut until the complementary screw threads of the nipple and nut enmesh. Tightening the body relative the nut pushes the head of nipple farther into the hose in the area of the biting threads of the nut and presses the hose outwardly to grip it tightly between the head of the nipple and the biting threads of the nut. The opposite pitches of the biting threads and the screw or machine threads prevent the hose from turning out of the nut as the nut and body are tightened. Here, the counter-clockwise threads of the nut that bite into the outside of the hose prevent axial displacement of the hose, i.e., the tendency for the hose to pull away from the fitting due to internal pressure or mechanical tension.

Fittings such as those disclosed in Zornow and DuPont are commercially available in a variety of sizes, and commercial stocks are kept for sizes up to four-inch (10 cm) diameter hoses or larger. However, such fittings have the drawback that they require rather substantial torque to force the respective threaded parts together sufficiently to grasp the inside and outside surfaces of the hose. Fully tightening the nuts on the fittings may require numerous turns, and the jamming action employed makes it necessary to apply progressively increasing torque. The initial turns may be accomplished by hand. Intermediate turns require wrenches. The final turns at the limits of jamming together the parts, especially for large hoses and fittings, require such torque as to be accomplished most readily only on a stable support for the fitting, such as a bench vise, to permit sufficient torque to be applied to one part of the fitting while holding another. This state of matters frustrates the goal of designing the fitting for installation in the field by the end-user without the need for benches, vises, special tools and the like, which are not often conveniently available near the place of installation of the hoses.

Substantial torque may also be required to unloosen the nuts from the fittings. It typically takes more torque to initially "break" or "crack" the nut, than it took originally to fully tighten the nut, thus being even more likely to require stable clamping of the fitting in a bench vise or the like. Thus the prior art fittings are not ideally suited for field use by the end-user without special tools, vises, heavy tackle and so on.

Insofar as the prior art fittings cause deformation of fitting parts, such as in DuPont, the fittings may be further rendered difficult to disassemble. Moreover, such deformation is such that new parts are needed for at least certain deformable parts of the fittings when installing fittings on a new hose, e.g., as in DuPont's collar, which once deformed may be difficult or impossible to slide over a new hose.

What is needed is a fitting for flexible hoses that solves these and other problems characteristic of conventional fittings, which is relatively handily attached to and detached from a hose, is relatively inexpensive, and which dependably provides a tight and secure sanitary seal.

SUMMARY OF THE INVENTION

It is an object of the invention to provide a re-usable fitting for flexible hose that is easily handled in the field by the end-user, without special tools, for replacement of worn hose and re-use of the fitting.

It is an alternative object of the invention in a fitting as described, to form a nipple to which the hose attaches in an arrangement which develops reduced frictional adhesion between the hose and nipple than conventional structures, thereby rendering it easier to remove from a worn hose, yet which achieves a secure seal.

It is another object of the invention to provide the fitting with a nut that tightens on the nipple and fulfills the functions of providing a primary seal and clamping the hose against axial dislocation, as well as providing secondary seals to isolate the internal structures and contact surfaces of the fitting from outside contaminants.

It is still another object of the invention to provide the above nut with internal ribs arranged such as saw-tooth barbs or the like, such that, during tightening of the nut on the nipple, the internal ribs bite into or grip the hose and force the hose partly in a direction in which the nipple flares out, to increase the clamping and sealing forces between the nut and the nipple against the hose.

It is an additional object of the invention to structure the nut and the nipple of a hose clamping fitting so that the nut can be hand twisted to near its fully tightened position, for example within a turn and a quarter, so that the last turn to clamp the fitting requires less torque than fittings which are structured to progressively tighten over a continuous wedging range.

It is a further object of the invention to form the nut and nipple such that the hose is substantially deformed in a series of axially spaced annular constrictions such that the hose is forced elastically to swell into enlarged regions on opposite axial sides of the annular constrictions.

These and other aspects and objects are provided according to the invention in a re-usable fitting for flexible hose, wherein the fitting is dimensioned to clamp against inner and outer surfaces of a hose of a given diameter and wall thickness. The fitting in accordance with the invention comprises a body partly defining a hollow nipple and a nut to tighten on the nipple. The nipple extends between a base in the body and head terminating in a terminal edge. The nipple carries external thread near the base, a series of external barbs near the head, and a shoulder between the thread and the barbs. The barbs define progressively smaller-diameter rings in the direction from the shoulder to the head. The barbs are collectively shaped and arranged for the function of swelling and flaring out an end portion of the flexible hose when fully frictionally engaged over the head and barbs, up to abutment against the shoulder.

The nut has an elongated hole that extends between an enlarged end and a reduced end. The hole in this nut is formed with internal thread near the enlarged end, and a series of internal barbs near the reduced or smaller diameter end. The barbs in the nut are generally the same in number to the barbs in the nipple, and are otherwise complementary opposites to the barbs on the nipple, for providing pinch points as described below. For example, these barbs in the nut, as contrasted to the barbs on the nipple, define progressively smaller apertures in the direction from the internal thread to the reduced end.

The nut hole is sized to allow the nut to be strung over an end of the hose, and slid to an out-of-the way position spaced from the end. The hose is fully frictionally engaged on the nipple, being flared from the reduced end toward the shoulder. The nut is then retrieved along the hose and the nut and nipple threads are engaged and screwed together. Gradually tightening the nut on the nipple drives the internal barbs into an alignment with the external barbs such that complementary pairs of the internal and external barbs to compress the hose in a series of axially spaced annular constrictions. These annular constriction between the opposed barbs elastically compress the wall thickness of the hose, and deform the hose to swell elastically into enlarged regions on axial opposite sides of the annular constrictions.

These annular constrictions form a primary seal between the hose and fitting along the flared end of the hose, and isolate the fluid or other medium to be communicated by the hose and fitting, to the inside of the hose and fitting. It is optional to shape the internal barbs as saw-tooth barbs so that, when the nut is tightened on the nipple, the saw-tooth barbs bite into or grip the hose to thereby force the hose in the direction in which the tapering the nipple flares out. That way, tightening the nut correspondingly increases the clamping and sealing forces between the nut and the nipple and against the hose. The barbs also help prevent the axial dislocation of the hose when the nut is fully tightened.

The pitch of the screw threads can be chosen such that tightening the nut from a position where the external barbs first lightly touch the flared hose, to a fully tightened position, is accomplished in about one and a quarter turns, particularly because the barbed portions of the nipple and nut are arranged to clamp around the hose material most substantially near the point at which the nut and nipple are fully threaded together. The base of the nipple can further comprise a stop surface for limiting the travel of the nut on the thread of the nipple to precisely define the end point of travel. This stop surface can also permit placement of a secondary seal between the nut and the base of the nipple, so as to isolate the enmeshed threads from outside contamination. Likewise, the head of the nipple and the reduced end of the nut cooperatively form another secondary seal, this time between the hose and the reduced end of the nut, for isolating the internal barbs of the nut from outside contamination. This is mainly accomplished by forming an inturned rim on the nut at the reduced end thereof. These secondary seals prolong the life of the fitting for many uses and re-uses.

The relatively sharp terminal edge of the head of nipple is formed with an internal radius to create a generally smooth flow passage across the transition between the terminal edge and the hose. A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

In the FIGURES, a re-usable fitting 10 for flexible hose 12 in accordance with the invention comprises a body 14 and a nut 16 forming complementary toothed tapering surfaces that are arranged to clamp over the flared end of hose 12 for sealing between the internal bore of the fitting and that of the hose. The proportions of the fitting 10 can be varied to suit the dimensions of hose 12, which has a given diameter (e.g., the inside diameter) and wall thickness, as well as a given compressibility and material surface texture, the embodiment shown being exemplary as applied to a sanitary hose and generally allowing for the usual dimensional variations that occur in mass production of flexible hose.

Figure 1:
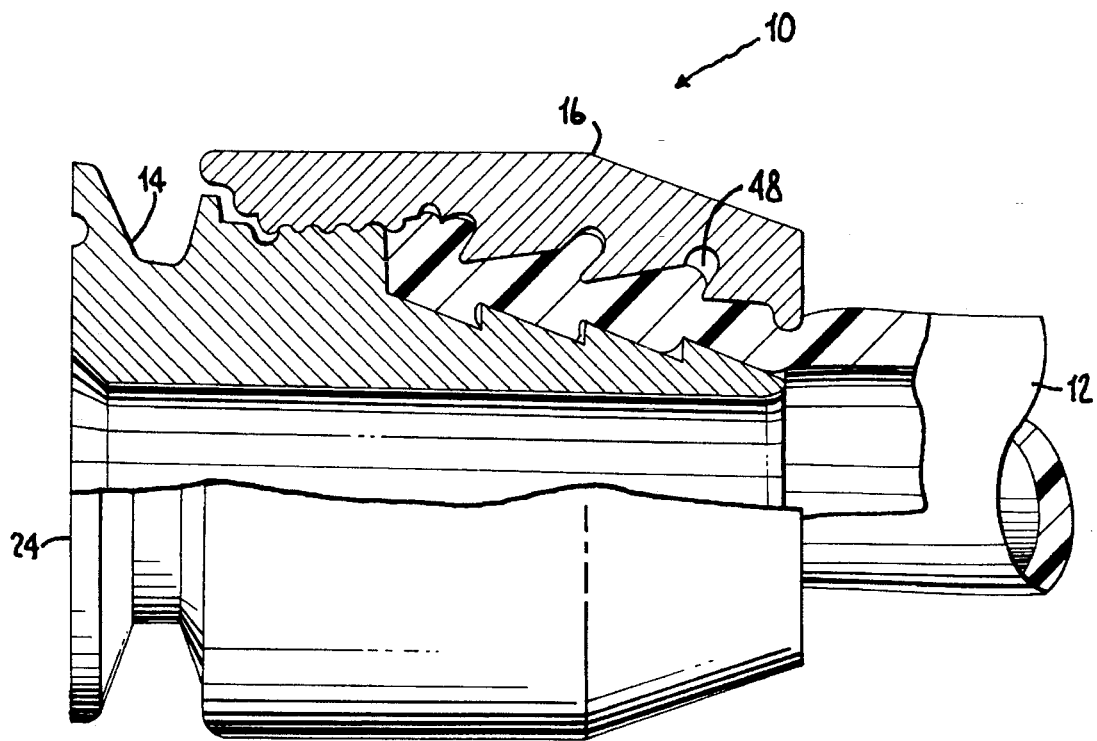
FIG. 1 is a side elevation view, partly in section, of a re-usable fitting for flexible hoses in accordance with the invention.
Figure 2:
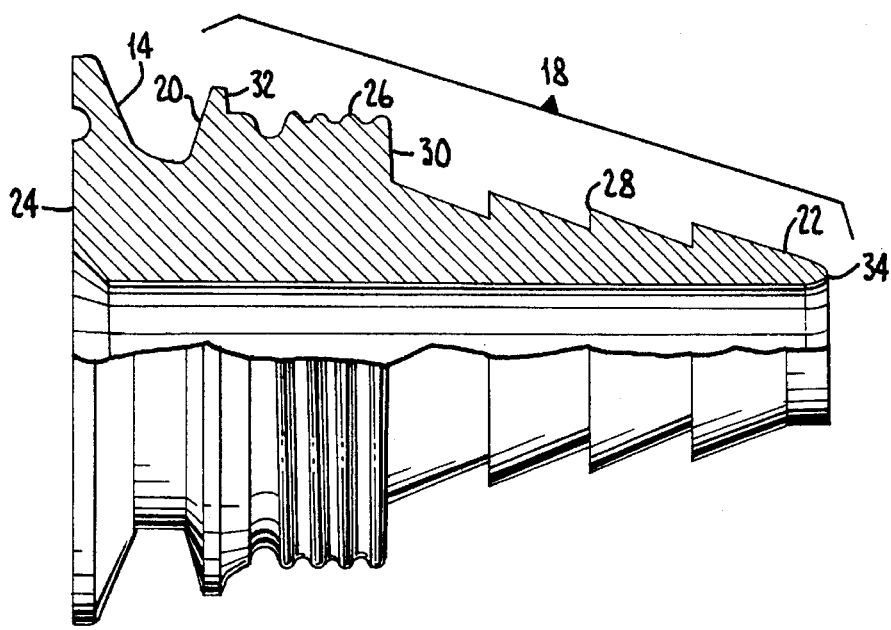
FIG. 2 is a side elevation view, partly in section, of the body of the fitting in FIG. 1.
Figure 3:
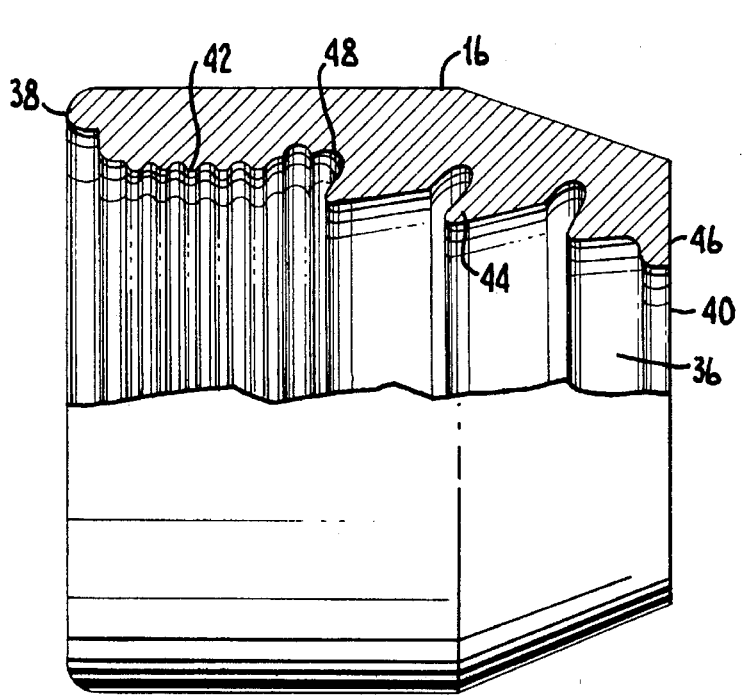
FIG. 3 is a side elevation view, partly in section, of the nut of the fitting in FIG. 1.

The body 14 is formed generally as a hollow nipple 18. The nipple 18 extends axially from a base portion 20 to a head 22. The base portion 20 blends into an opposite end 24 of the body 14 which, as shown in FIGS. 1 and 2, is formed as a standard adapter for a sanitary clamp-and-gasket style coupling. However the adapter end 24 of the body 14 can be formed in other arrangements such as male or female pipe thread, male or female screw thread, pipe flange, ferrule weldments and so on. The sanitary clamp and gasket style 24 is illustrated as an example of the many fitting types to which the fitting of the invention can be applied, and not to limit the fitting 10 to a particular such engagement structure for attachment to other fittings, receptacles and the like.

The nipple 18 carries external screw thread 26 near the base 20, a series of external ribs or barbs 28 near the head 22, and a shoulder 30 between the thread 26 and the ribs 28. The base 20 terminates in a flanged stop surface 32 for limiting the travel of the nut 16 thereon. The head 22 of the nipple 18 terminates in a relatively sharp terminal edge 34, which is formed with an internal curvature to create a generally smooth flow passage across the transition between the terminal edge 34 and the hose 12, as shown in partly sectional view in FIG. 1.

The successive ribs or barbs 28 progressively decrease in outer diameter, one to the next, from shoulder 30 to head 22. In the embodiment shown, ribs or barbs 28 are provided at three axially spaced locations and form a truncated cone with the barbs or ribs thereon. The ribs 28 are flat cut or even undercut on the axial sides that face the shoulder. This flat cut or undercut structure of ribs 28 gives the ribs 28 a "bite" into the hose 12 that resists axial dislocation of the hose 12 from the fitting. Thus the ribs 28 are shaped like saw-tooth barbs. The shape and orientation of the ribs 28 acts to bite into or grip the hose 12 while the nut 16 is being tightened on the nipple 18.

The shape and arrangement of the head 22 and ribs 28 as whole are such as to form a progressively diverging shape to the end of hose 12, with a radially-outward flare or taper, leading into the fitting, in the direction from the head to the shoulder. Although the shape is generally conical, it has a relatively shallow angle of divergence, namely about ten degrees relative to the central axis in the embodiment shown. This divergence, flare or taper of the nipple 18 acts to swell and/or flare out an end portion of the flexible hose 12 when the hose 12 is fully frictionally engaged over the head 22 and ribs 28, abutting against the shoulder 30, as shown in FIG. 1.

The nut 16 shown in the FIGURES as a preferred embodiment is a single solid piece of material. However, the inventive aspects as described herein could be incorporated in two or more pieces, such as a complementary collar and sleeve, and while these are not shown, they are nevertheless encompassed according to the invention. The preferred material for the nut 16 and body 14 alike is 316L stainless steel, which is suitable for many sanitary hose applications. Other comparably functional materials can be substituted in place of stainless steel.

The nut 16 has an elongated hole 36 that extends between an enlarged end 38 and a reduced end 40. The hole 36 of the nut 16 is axially formed with internal screw thread 42 near larger end 38, complementary to threads 26 on body 14, and a series of internal ribs 44 near the reduced end 40. The reduced end 40 is formed with an inturned rim 46. In FIG. 1, the nut 16 is depicted in the extreme tightened position on the body 14. The nut 16 is limited out, and is generally precluded from tightening any further. The nut 16 and body 14 are sized relative to each other such that the terminal edge 34 of the nipple 18 aligns substantially coplanar with the inturned rim 46 of the nut 16. Preferably, the terminal edge 34 aligns such that it occupies a plane that bisects the inturned rim 46 (as viewed in FIG. 1 ). By this alignment, the terminal edge 34 provides a backing for application of pressure against the flexible hose 12 by the inturned rim 46. To this end, the head 22 of the nipple 18 and the reduced end 40 of the nut 16 cooperatively form a secondary seal for the fitting 10, to isolate the internal ribs 44 of the nut 16 from outside contamination.

The primary seal for the fitting 10 is formed between the engagement of the flexible hose 12 and the nipple 18. The function of the primary seal is to isolate the fluid or medium to be communicated by the hose 12 and fitting 10 from outside contamination, as well as confining the fluid or medium to inside the hose and fitting. Preferably the primary seal is provided substantially between the hose 12 and the terminal edge 34 of the head 22 of the nipple 18. However the external ribs 28 on the nipple function as back-up or fail safe seals to ensure a working primary seal.

Another secondary seal is formed between the base flange 32 of the nipple 18 and the enlarged end 38 of the nut 16. An O-ring or other similar gasket can be nested therebetween to isolate the enmeshed screw threads 26 and 42 from contaminants. Secondary seals are advantageous to prolong the life of the fitting 10 by isolating its working parts from outside contaminants.

The internal ribs 44 on the nut 16, like the ribs 28 on the nipple 18, progressively decrease in size, but in this case in the direction from the internal thread 42 to the reduced end 40, substantially opposed to the ribs 28 on body 14. The successive internal ribs 44 thus define progressively smaller-diameter apertures in three axially spaced locations in the embodiment shown. These ribs 44 are to form barbs as saw-tooth shaped barbs. By this arrangement, the ribs 44 bite into or grip the outside of the hose 12 as the nut 16 is tightened on the nipple 18. Additionally, axial displacement of the nut 16 when tightened tends to drag the hose 12, via the grip of the ribs 44 thereon, further rearwardly on the nipple 18 (i.e., left in FIG. 1), or in the direction in which the tapering nipple 18 flares out, to gain increased clamping and sealing forces between the nut and the nipple, as against the hose. As such, the hose 12 is forced elastically to swell into enlarged, pouch-like regions 48 on opposite axial sides of the ribs 44. The ribs 44 also help prevent axial dislocation of the hose 12 relative the fitting 10.

Whereas the shape and arrangement of the ribs 44 on the nut 16 as a whole complement the corresponding same number of ribs 28 on the nipple 18, the fitting deforms the end of the hose by providing a series of angular compression zones or bites between the ribs or teeth inside and outside the hose, respectively.

The smallest diameter of the nut hole 36 is defined by the inturned rim 46 of the reduced end 40. This smallest diameter is still sufficient to allow nut 16 to be strung along hose 12. For assembling the fitting and hose, nut 16 first is passed back along hose 12 to a position clear of the portion at the end of hose 12 to be engaged in the fitting. The hose 12 is then frictionally engaged on the nipple 18, being pushed over the head 22 and ribs 28, until abutted against the shoulder 30. This flares the end of the hose somewhat. Nut 16 is then retrieved from its position along the hose and passed over the flared end until screw threads 42 of nut 16 can be threaded onto screw threads 26 of nipple 18. As the threads are first engaged, space remains between ribs or teeth 28, 44 on the two parts. Tightening nut 16 on the nipple 18 advances the ribs 28, 44 axially toward one another. Ribs 28, 44 are arranged in complementary pairs, being axially spaced and at suitable diameter to come into alignment in complementary pairs along the flared end of the hose. These pairs bite into the hose as they align and form a series of annular constrictions where the hose is engaged and sealed to the fitting.

Between the annular constrictions, the flexible hose material is compressed into the available area, and generally form ridges that are mechanically coupled as well as sealed to the fitting elements. The exemplary fitting 10 shown in the drawings has three annular constrictions, but it will be appreciated that other numbers are also possible. The inside diameter of each annular constriction is progressively smaller in the direction from the base 20 of the nipple 18 to the head 22. The radial dimension of each annular constriction, i.e., the difference between its outside and inside radius, is substantially smaller than the wall thickness of the hose 12.

The tapered tooth arrangement is such that the fitting reaches its full locking tightness relatively abruptly as ribs 28, 44 come into final alignment. The pitch of the screw threads 26 and 42 can be chosen, for example, so that tightening nut 16 from a position where the external ribs just touch against the flared hose end, to a position fully tightened, occurs in about one and a quarter turns. As a result, nut 16 can be tightened by hand to about within the last turn and a quarter of being fully tightened, before a wrench is required.

It has been discovered that substantially less torque is required to completely tighten the fitting 10 in accordance with the invention, including over the last turn and a quarter, than for comparably sized conventional fittings. There is less frictional resistance than in comparably sized fittings. Nut 16 in accordance with the invention can be cracked or initially loosened with substantially less torque. The only part of the structure that is deformed by the connection is the end of the hose, which of course is the part that is generally first replaced.

A worn hose is easily removed from the nipple 18 after removal of the nut during repair in the field, notwithstanding ribs 28. Because the hose 12 is flared out slightly, it pulls off the nipple 18 more easily than comparably sized hose can be removed from a cylindrical nipple, where frictional adhesion occurs over an axial length, especially a ribbed cylindrical nipple. The flared arrangement of the fitting also lessens the chance that the user will choose to cut a stuck hose longitudinally to remove it, which would undesirably risk scoring the ribs or barbs 28 and potentially affect the ability of the ribs or barbs 28 to form the primary seal.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A fitting for flexible hose of a given diameter and wall thickness, the fitting comprising:

a body partly formed as a hollow nipple that extends from a base to a head;

a nut tightenable on the nipple, the nipple carrying external thread in part, and a series of external ribs in other pans between the thread and the head, wherein said ribs define progressively smaller rings in the direction from the thread to the head, the nipple tapering at the ribs to flare an end portion of the flexible hose when engaged over the head and ribs, the nut having an elongated hole that extends between an enlarged end and a reduced end and which is formed with internal thread in part and a series of internal ribs in other parts between the thread and the reduced end, wherein said internal ribs are formed over a taper generally complementary to the nipple and define progressively smaller apertures in the direction from the internal thread to the reduced end, wherein tightening the nut on the nipple drives the internal ribs into an alignment with the external ribs such that complementary pairs of the internal and external ribs compress the hose in a series of axially spaced constrictions, for mechanically engaging and sealing the fitting and the hose wherein each of the internal ribs comprises a pair of sidewalls disposed at an angle to each other, the sidewalls extending inwardly from respective sidewall bases on the inner surface of the nut and in the direction the nut advances when tightened, the sidewalls terminating in an acutely angled edge, the edge being oriented to point substantially in the direction the nut advances when tightened, thereby reducing frictional resistance to tightening of the nut; and annular troughs defined within the hole of the nut and extending radially outwardly from the bases of the sidewalls, the troughs having substantially semi-circular cross sections and substantially smooth walls, thereby forming enlarged regions with a pouch-shaped cross section within the nut, the enlarged regions sized so that, when the nut is manually tightened, a sufficient amount of hose material is retained in the enlarged regions to resist separation of the fitting from the hose under normal operating conditions.

2. The fitting of claim 1, further comprising an inturned rim at the reduced end of the nut and wherein the flexible hose and the nipple each have inner walls, the inturned rim extending inwardly to compress the hose when the hose is received through the hole, the inturned rim having a portion which, when the nut is completely tightened, is located immediately beyond the terminal edge of the nipple and adjacent to a plane extending through the terminal edge of the nipple, thereby compressing the hose at a location proximate to and beyond the terminal edge of the nipple, the inturned rim extending inwardly a sufficient amount to urge the inner wall of the flexible hose into substantial alignment with the inner wall of the nipple.

3. The fitting of claim 1, wherein the constrictions form a primary seal between the hose and fitting to isolate the fluid or medium to be communicated by the hose and fitting, internally within the hose and fitting.

4. The fitting of claim 1, wherein one of the internal and the external ribs are formed as barbs to bite into the hose and prevent axial dislocation thereof after being tightened between the nut and nipple.

5. The fitting of claim 1, wherein both the internal and the external ribs are formed as barbs to bite into the hose and prevent axial dislocation thereof after being tightened between the nut and nipple.

6. The fitting of claim 1, wherein the annular constrictions define annular cross-sectional areas of substantially smaller radial dimensions than the wall thickness of the hose, such that the deformed hose elastically swells into enlarged regions on opposite axial sides of the annular constrictions.

7. The fitting of claim 1, wherein the tapering of the nipple and nut and the pitch of the screw threads are chosen such that tightening the nut from a position where the external ribs first engage against the flared hose, to a fully tightened position, occurs over about one and a quarter turns.

8. The fitting of claim 7, wherein the base of the nipple further comprises a stop surface for limiting the travel of the nut on the thread of the nipple the stop surface defining a closest approach of the ribs of the nipple and the nut, respectively.

9. The fitting of claim 8, wherein the stop surface is formed to permit placement of a secondary seal between the nut and the base of the nipple to isolate the enmeshed threads from outside contamination.

10. The fitting of claim 1, wherein the internal and external ribs form at least annular constrictions three in number.

11. The fitting of claim 1, wherein the head of the nipple terminates in a relatively sharp terminal edge, which is formed with an internal curvature to create a generally smooth flow passage across the transition between the terminal edge and the hose.

12. The fitting of claim 1, wherein the head of the nipple and the reduced end of the nut are cooperatively formed with secondary seal means between the hose and the reduced end for isolating the internal ribs from outside contamination.

13. The fitting of claim 1, wherein the body further comprises an adapter end as opposite to the nipple, for placing the flexible hose in communication with another fluid channel opposite the fitting.

14. The fitting of claim 1, wherein the nut is formed from a single solid piece of material.

15. The fitting of claim 1, wherein the nipple further comprises a shoulder between the external thread and the external ribs for limiting the travel of the end of the hose on the nipple.

16. A flexible hose for sanitary applications comprising:

an inner hose wall of a predetermined diameter;

a fitting secured to at least one of the ends of the hose, the fitting comprising a nipple with an inner wall, the nipple being partially receivable within the inner hose wall, and a nut tightenable on the nipple, the nut having a reduced end and an inner surface defining a hole extending longitudinally therethrough, the nipple having a bore extending therethrough;

ribs extending radially inwardly from the inner surface of the nut, the ribs comprising first and second sidewalls disposed at an angle to each other, the sidewalls having opposite ends, the first sidewalls generally facing in the direction the nut is tightened and the second sidewalls generally facing away from the direction the nut is tightened, the sidewalls terminating in an acutely angled edge, the edge being oriented to point substantially in the direction the nut advances while being tightened, thereby reducing frictional resistance to tightening of the nut;

annular troughs extending at an angle to and radially outwardly from one of the ends of the second sidewalls, the troughs having substantially semi-circular cross sections and substantially smooth walls, thereby forming enlarged regions of substantially semicircular cross section located radially beyond the second sidewalls, the enlarged regions sized so that, when the nut is manually tightened, a sufficient amount of hose material is retained in the enlarged regions to resist separation of the connector from the hose under normal operating conditions; and an inturned rim at the reduced end of the nut, the inturned rim extending inwardly over the hole of the nut sufficiently to bear against and radially compress the flexible hose when received through the hole and allow for the nut to be strung along the hose upon application of sufficient manual force, the inturned rim having a portion which, when the nut is completely tightened, is located immediately beyond the terminal edge of the nipple and adjacent to a plane extending through the terminal edge of the nipple, thereby urging the inner hose wall into substantial alignment with the inner wall of the nipple.

* * * * *